Sept. 20, 1927.

P. R. TUCKER 1,642,798

MANURE DISTRIBUTOR

Filed June 21, 1924

Inventor

Pinkney R. Tucker

By Henry Orth Jr

Attorney

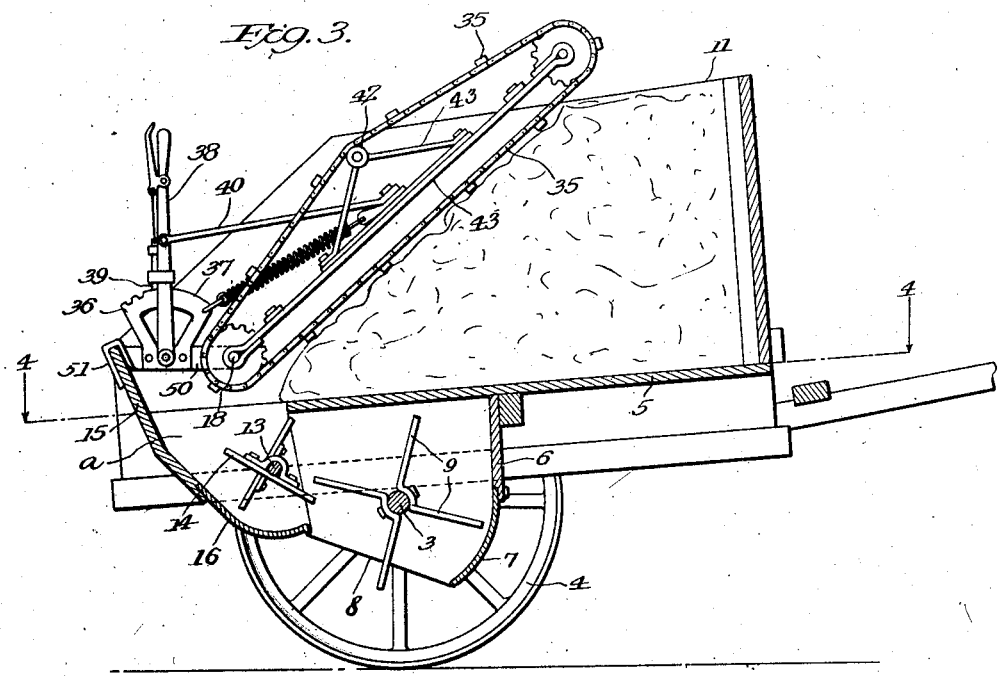

Patented Sept. 20, 1927.

1,642,798

UNITED STATES PATENT OFFICE.

PINKNEY RUFFIN TUCKER, OF GUILFORD COUNTY, NORTH CAROLINA, ASSIGNOR OF TWO-FIFTHS TO ALBERT E. REITZEL, OF WASHINGTON, DISTRICT OF COLUMBIA.

MANURE DISTRIBUTOR.

Application filed June 21, 1924. Serial No. 721,447.

My invention relates to manure spreaders, and has for its object to construct a simple one man, one horse manure spreader, especially adapted to distribute stable or farmyard manure in rows.

To this end the invention consists of a cart and means to deliver manure from one end of the cart body, preferably the tail end, to a point beneath the body at or near the axle of the cart. Delivery at or approximately at such a point is necessary for an efficient row spreader employing a cart, because such a point is the center of swing or waver to one side or the other of the furrow by the draft animal.

As is well known, a horse, mule or ox will not walk continuously in the bottom of a furrow, and will sometimes walk on the land side and sometimes on the ridge side, and in doing so the cart pivots on its two wheels about a point at or near the middle of the axle, so that when the manure is discharged at or close to such point it will always drop into the furrow regardless of some deviation of the draft animal.

The invention comprises, preferably but not necessarily, automatic means, operated from one or both cart wheels, to move the manure from the cart body into delivery and agitating mechanism, also operated from one or both cart wheels, to discharge the manure at or near a point beneath the middle of the axle.

I believe I am the first to make a manure spreader of the cart or two-wheeled type capable of operation by one man and one draft animal.

An object of my invention is to provide an implement for distributing manure in the row, that will not fail through choking, tunnelling, or otherwise, to deliver manure, whether wet or dry, properly in a row practically uniformly in whatever quantity for which set within the range of quantity required for farm and garden planting in the row.

A further object is to provide such an implement light in weight, through made of the materials and in the manner necessary where the cost of the implement must be low in order for it to be of profitable use on farms of small as well as those of large acreage, in view of such implements being used only during the planting seasons of the year.

A further object is to provide such an implement, mounted on two wheels, and its mechanism drivable with such little power that combined with the light weight of the implement, it can easily be drawn and operated with one farm horse of average size.

The novel arrangement and special relation of the parts of my implement, wherein I overcome the difficulties I have pointed out and attain the objects stated, as well as details relating to economy of construction and operation, will definitely appear from the detailed description to follow.

Referring to the drawings, in which like parts are similarly designated—

Fig. 3 is a plan with the unloading mechanism removed and

Fig. 4 is a longitudinal section on line 4—4 Fig. 3.

Figure 1:
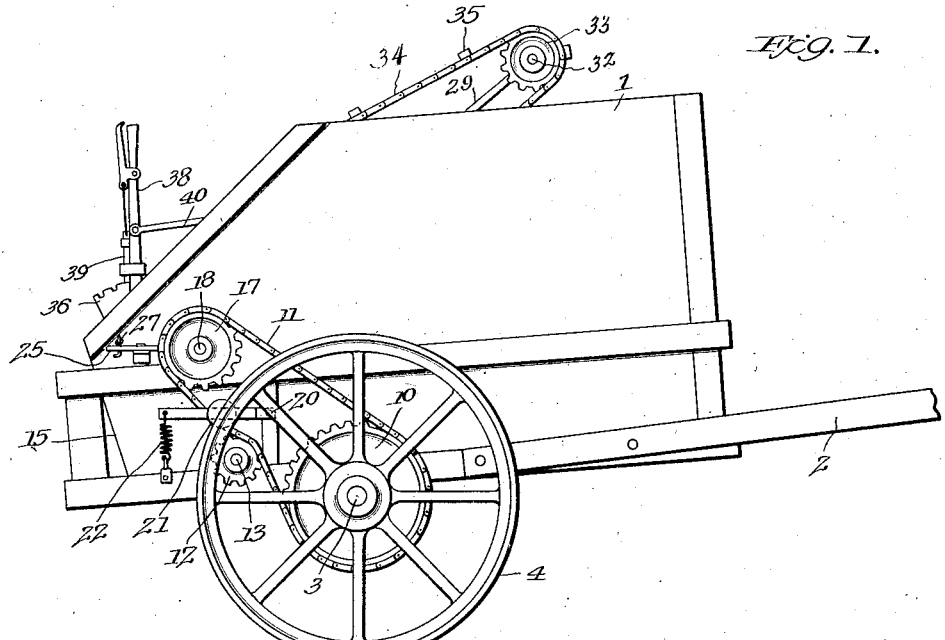
Figure 1 is a side elevation of my manure distributor.
Figure 2:
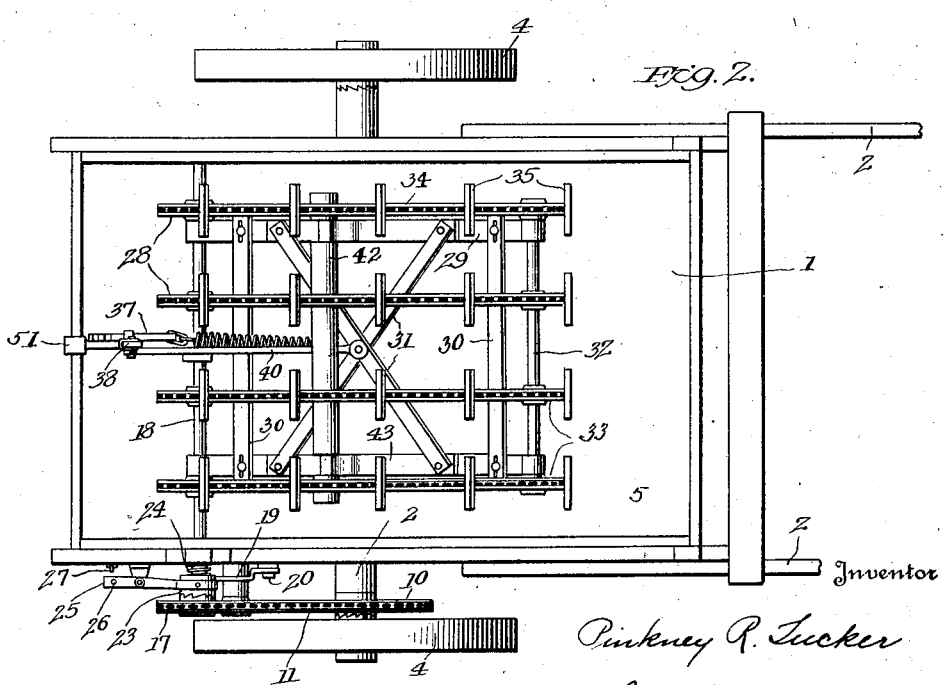
Fig. 2 is a plan.

My one horse manure row-spreader comprises a body 1, shafts 2, axle 3 and two wheels 4.

The body 1 has a floor 5 extending back of the axle 3 and beneath the floor is a casing 6 through which the axle 3 extends. This casing has a concave sheet metal front wall 7 extending to a constricted discharge opening 8 to deliver the manure to a row.

On the axle 3 in the casing 6 is a set of discharge arms 9 wholly below the bottom 5. The axle 3 is journalled in the road wheel with a pawl and ratchet connection to each wheel as customary in agricultural implements so as to cause the axle to continue to rotate when the vehicle makes a turn. On the axle 3 is a sprocket wheel 10 on which is a sprocket chain 11 that passes over a small sprocket wheel 12 on a counter-shaft 13.

This counter-shaft 13 has two sets of stirrer arms 14, one set on each side of the set of discharge arms 9, as illustrated in Fig. 4.

The shaft 13 is below the rear edge of the bottom 5 and the stirrer arms rotate below this bottom in a direction opposite to the discharge arms.

Spaced from the rear edge of the bottom is the rear wall 15 of the body 1, slanting downwardly and forwardly and terminating in a concave 16 in which the stirrer arms 14 work.

The sprocket chain 11 also passes around a sprocket wheel 17 loose on a shaft 18 located above and between the rear end of the floor 5 and the rear wall 15 of the body 1. This shaft 18 supports and operates the unloading mechanism.

A chain tightener comprising an arm 19 pivoted on a bolt 20 carrying a roller 21 engaging the chain, maintains the slack out of the chain. The arm is loaded by a spring 22, and the roller engages the chain between the sprocket wheels 12 and 17.

The loose sprocket wheel 17 is connected to shaft 18 by a clutch whose movable member 23, is urged into driving connection by a spring 24. This member is operated by a shifting arm 25 having a hole 26 in which a hook 27 may be placed to hold the clutch disconnected to temporarily prevent the unloading mechanism from operating while going from barnyard to field. The unloading device has several sprocket wheels 28 secured thereto.

Pivoted at one end on shaft 18 is a frame composed of longitudinal members 29, and adjustable transverse member 30 and crossed braces 31. At the opposite end of the frame is a shaft 32 carrying sprocket wheels 33 similar to those 28 and similarly spaced.

Over each pair of sprocket wheels 28, 33 is a drag chain 34 provided with any kind of suitable drags 35.

A sector 36 having teeth at its rear portion and a plain arc 37 at its front portion is mounted on the body as shown. The sector is secured to an iron 50 having an eye supported by shaft 18 and a hook portion 51 engaging over the rear board 15 of the body. A lifting arm 38 provided with the customary hand-operated latch 39 is pivoted to ride over said sector. The arm 38 is connected to the frame by a link 40, preferably at the crossing of the braces 31. A spring 41 is connected between the sector or other stationary part and the frame, to partially relieve the load of the unloading mechanism on the lifting arm.

42 is a roller mounted in brackets 43 for supporting the upper stretches of the drag chains 34 and for tightening said chains.

The operation of my manure spreader is as follows:

Assume the unloading device to be lifted and latched, the body 1 to be loaded, and the clutch 23 held disengaged by hook 27.

The unloading mechanism does not operate, but the distributor arms 9 rotate with the axle 3 and wheels 4. When the field is reached and the row straddled by the wheels, the horse walking in the furrow, the latch 39 is released and the frame and drag chains allowed to rest by gravity on the load. The clutch is then thrown into engagement, and the drag chains rotated, the lower stretches acting on the surface of the load and gradually delivering the load over the rear edge of the bottom 5.

The manure is thus delivered by gravity first to the stirrer arms 14 rapidly rotating by reason of their small driving sprocket 12, the lumps being quickly stirred out, and the manure is then delivered by these stirrer arms into the narrow discharge hopper 6, and its delivery controlled by the slowly rotating delivery arms.

The latch 39 riding on the untoothed portion 37 of the sector 36 allows the frame and drag chains to lower in accordance with the discharge of the load until it reaches a position parallel or nearly parallel with the floor 5.

The smaller particles of manure or fines which result from the dragging from the top of the load, and the loading into the implement, fall almost directly from bottom 5 onto the rear wall 15 and off stirrer arms 14 onto the side walls $a$. Thence such particles slide into concave 16.

Shaft 13 carrying arms 14 is geared by reason of small sprocket wheel 12 to rotate faster than the shaft carrying the wheels which rotate the drag chains. Whatever chunks of manure are too large to fall through to the concave are moved by arms 14 backwardly over against rear wall 15 and side walls $a$. As other manure is thus moved by these arms, most of the chunks are crushed against each other and between these arms and said walls and stirred to pieces. At the same time arms 14 move the manure fines in concave 16 forwardly to delivery outlet 8. Any large chunk moved along is then carried on top of an arm 9 forwardly over shaft 3 and crushed where carried past the concave 7 to the delivery outlet. If not so caught on top of an arm 9 the chunk comes against the back of an arm 9, and owing to the slow rotation of shaft 3 as compared to that of shaft 13, the chunk is cut and further stirred by arms 14 as they pass arm 9 and in many cases are carried by them backwardly over shaft 13.

By reason of concave 16 being positioned as shown the broken up manure received therein is retained until moved forward, by the stirrer arms yet some of the fines therein will be moved by arms 14 directly to the delivery outlet. Owing to arms 9 in the outlet coming up therethrough at the edge to which such manure is moved it is in great part raised up by these arms and distributed along the edges of the outlet, thus aiding in uniformity of distribution in the row.

By placing concave 16 together with the hopper chamber above it, between the load and the outlet, both can be made large enough to allow arms 14 sufficient length to insure their extending near to or above the level of manure which accumulates in the chamber when fed from the load in sufficient quantity to insure regular feed to the outlet, though the quantity dragged from the load may vary owing to the irregular character of the manure. Therefore, the manure will not tunnel over arms 14.

Owing to the fact that tunnelling is eliminated and only so much manure need be dragged off the load to the stirring arms 14, as will allow sufficient accumulation in the concave to insure a regular feed to the outlet though the quantity dragged from the load may vary owing to the irregular character of the manure, choking is also eliminated.

These features, the simple gearing required, and the little power necessary to operate the mechanism due to the special arrangement of parts and the fact that only a comparatively small part of the load of manure is being operated on at any given time by the mechanism, makes the implement one of light draft and permits of it being inexpensively constructed.

It will be noted that my arrangement permits the axle to be substantially under the center of the vehicle and that the distributor arms are also about at the middle of the vehicles, so that the discharge at 8 will be sufficiently forward not to be thrown onto the driver walking behind the spreader.

The rate of feed can be controlled by increasing or decreasing the number of drags 35 that are fastened to the drag chains, and the rate of rotation of both shafts 13 and 18 can be controlled by change sprocket wheels.

The manure, well stirred, is not distributed broadcast, but is confined by reason of the inclined sides *a* of the compartment in which the stirrers 14 operate, and still more concentrated to row width by the inclined sides of hopper 6.

I claim—

1. In a manure spreader, a body having a stationary floor and means to deliver manure over the rear edge of said floor in combination with means receiving the delivered manure and discharging it forward beneath the body.

2. In a manure spreader, a wheel supported body having a stationary floor and mechanism unloading the manure over one end of said floor and body, means beneath the floor at said end to receive the manure and discharge it beneath the floor longitudinally toward the middle of the body at a point between the wheels and inside the periphery of the wheels.

3. In a manure spreader, a wheel supported axle, a body supported on the axle, means extending below the body to receive manure therefrom and directed to deliver beneath said body, stirrers therein, a casing beneath the body at the axle thereof, and discharge arms on the axle in the casing for receiving manure from said stirrers and discharging it beneath said body.

4. In a manure spreader, a vehicle body having a stationary floor, means to deliver manure from one end of said floor, stirrer means beneath the floor to receive, and discharge the received manure toward the opposite end of said floor, and rotary discharge means receiving manure from the stirrers and discharging the manure beneath the floor.

5. In a manure spreader, a body having a stationary floor, means to deliver manure over one end of said floor across its entire width, means to receive and diminish the breadth of the manure, stirring means cooperating with the receiving means and delivering the manure beneath the floor of the body, means beneath the body receiving the manure and further diminishing the breadth thereof after it has been stirred by said stirring means, and means associated with the latter means to discharge the manure therefrom at row width.

6. In a manure spreader, a body having a stationary floor, an axle for the body, means to deliver manure over the rear end of said floor, means including a concave to receive the manure so delivered, stirrers cooperating with said concave to stir and deliver the manure therefrom toward the middle of the body, means at the axle including a concave discharging in opposite direction to receive the manure from the stirrers, and discharge arms on said axle cooperating with the latter concave.

7. In a barnyard manure spreader, a body, an axle, two wheels supporting the axle and body and being the sole mechanical support for the spreader, from the extreme end of which body manure is to be delivered, in combination with means on the body directly receiving the delivered manure and discharging it longitudinally beneath the body at a point between the wheels and inside the periphery of the wheels.

8. A manure spreader, comprising a cart having a body, a rotatable axle and a pair of road wheels, in combination with means on said cart to receive manure from the rear end thereof and deliver it beneath the cart toward the axle thereof, discharge means on the axle and rotatable therewith receiving and delivering manure and discharging it beneath the cart.

9. In a manure spreader, a body, means to deliver from the rear end thereof, a concave to receive the manure so delivered, means to discharge the manure substantially horizontally from the concave, a second, oppositely directed concave receiving the manure, and discharge means discharging the manure substantially in an opposite direction beneath the spreader.

In testimony that I claim the foregoing as my invention, I have signed my name hereto.

PINKNEY RUFFIN TUCKER.